Nov. 29, 1966  B. O. ROSAEN  3,288,291
BAYONET FILTER DEVICE
Filed Aug. 23, 1965
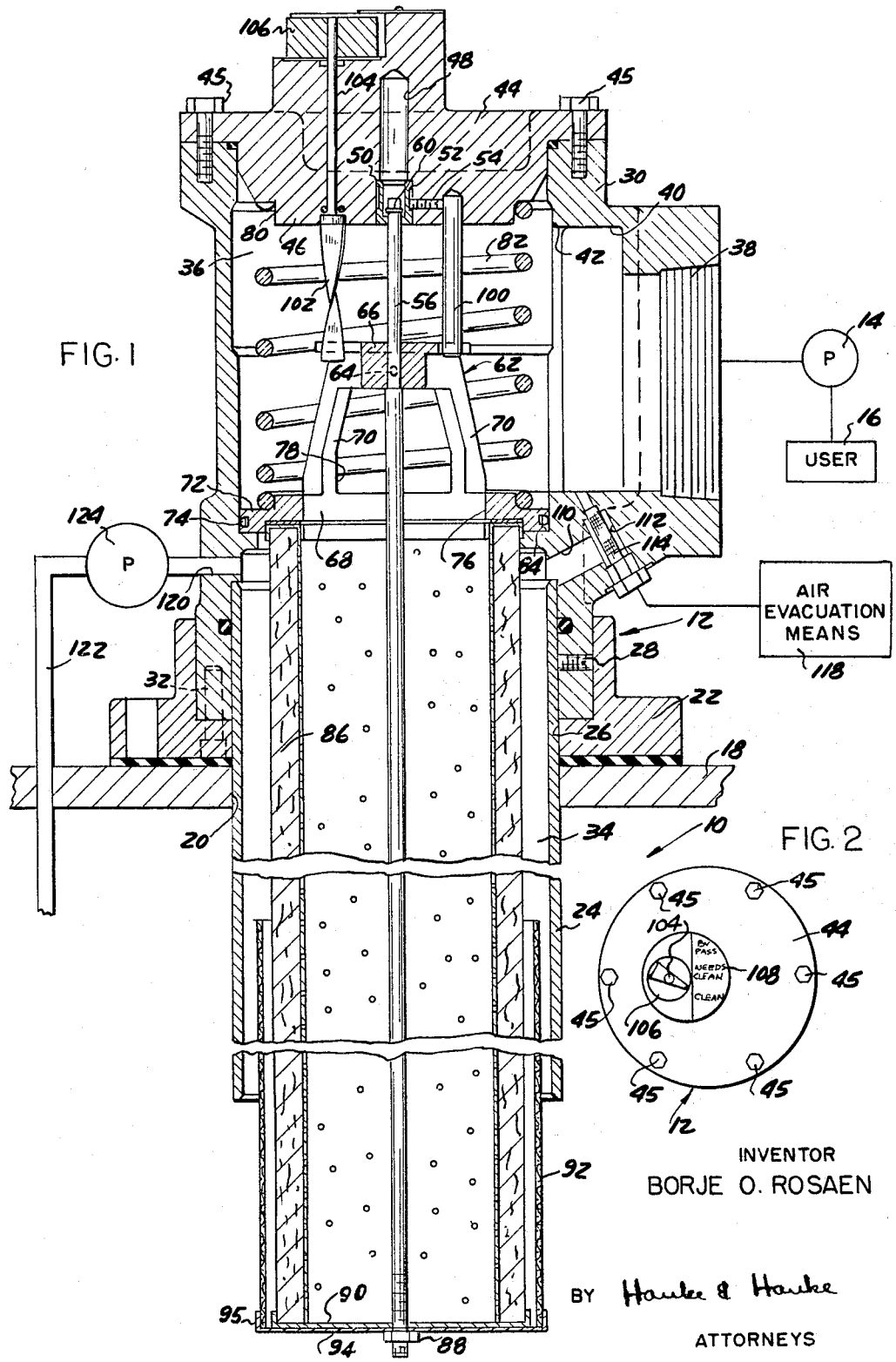
INVENTOR
BORJE O. ROSAEN
BY Hauke & Hauke
ATTORNEYS

United States Patent Office 3,288,291
Patented Nov. 29, 1966

3,288,291
BAYONET FILTER DEVICE
Borje O. Rosaen, Ann Arbor, Mich., assignor to The Rosaen Filter Company, Hazel Park, Mich., a corporation of Michigan
Filed Aug. 23, 1965, Ser. No. 481,688
4 Claims. (Cl. 210—90)

The present invention relates to fluid systems, particularly to those fluid systems having a filter device adapted to be mounted to extend into the fluid reservoir for such systems and more particularly to an improvement for such a filter device comprising a screen member encompassing a portion of the inlet side of the filter element.

Certain copending applications Ser. Nos. 279,930 and 279,935, each having a filing date of May 13, 1963, now abandoned in favor of continuation-in-part applications Ser. Nos. 340,365 and 341,488, respectively each filed January 27, 1964, and Ser. Nos. 313,524 and 313,627, each having a filing date of October 3, 1963, disclose certain new mobile or bayonet filter devices which are adapted to be inserted into the reservoir of a fluid system. These new filter devices have the particular advantage that much of the housing structure heretofore necessary for filter devices is eliminated. This produces a substantial savings in the manufacturing costs of such devices. Further, the filter devices are readily accessible for removal of the filter element for cleaning or replacement and means are provided for bypassing the filter element when it reaches a predetermined clogged condition. Indicating means are provided exteriorly of the filter device for indicating the condition of the filter element.

The present invention provides an improvement for such filter devices in the form of a substantially cylindrical screen member mounted in a position to encompass at least a portion of the inlet side of the filter element. The screen member is preferably of a coarser construction than the filter element so that it acts to remove large foreign particles which would otherwise clog the filter element. The screen member is preferably mounted to extend only a portion of the length of the filter element so that if the screen member becomes clogged, the fluid to be filtered can bypass the screen to be filtered by the element. The screen member also provides an obstruction in the path of fluid flow tending to collect air bubbles which would otherwise collect on the filter element and thereby reduce the filtering capacity of the element. Means are provided for continuously drawing off the collected air during operation of the system.

Further, the screen member tends to reduce the amount of foreign particles which will be dislodged from the filter element during removal of the element. As the filter element is removed from the filter device for cleaning or replacement, fluid within the filter element tends to flow in a reverse direction from the outlet side of the element to the inlet side of the element. This reverse flow or backwash normally tends to dislodge the foreign particles collected on the inlet side of the element and dump these particles back into the reservoir of the fluid system where they can, upon resumption of the fluid system, soon clog the filter element. The screen member tends to reduce this backwash effect in two ways: first, considerable amount of the foreign particles will be caught between the inlet side of the filter element and the inside of the screen member during the backwash; and secondly, the screen member will substantially reduce the rate of flow through the filter element to thereby reduce the force tending to dislodge the foreign particles.

It is an object then of the present invention to improve filter devices such as those disclosed in the aforementioned copending applications by providing a screen member mounted to encompass a portion of the inlet side of the filter element of such devices.

It is still another object of the present invention to increase the effective life of the filter element for mobile filter devices or the like by providing a screen member spaced from but substantially encompassing the filter element to provide a means for collecting large foreign particles before they clog the filter element, a means for collecting air bubbles which would normally interfere with filtration by the filter element, and a means for reducing the foreign particles which will be dislodged from the filter element during removal thereof.

Further objects and advantages of the present invention will be readily apparent to one skilled in the art to which the invention pertains upon reference to the following description. The description refers to the accompanying drawing in which like reference characters refer to like parts throughout the several views and in which FIG. 1 is a longitudinal cross sectional view of the preferred filter device of the present invention with portions of the preferred fluid system illustrated diagrammatically, and FIG. 2 is a top elevational view of the preferred device shown in FIG. 1 reduced in size somewhat and with portions not shown for convenience.

Now referring to the drawings for a more detailed description of the invention, a preferred fluid system is illustrated as comprising a fluid reservoir 10, filter device 12, a main fluid pump 14, and a fluid user 16. The fluid reservoir 10 preferably comprises a top plate 18 and is at least partially filled with a suitable fluid (not shown). An opening 20 is provided in the plate 18. The filter device 12 preferably comprises a mounting member 22 carried by the top plate 18 of the reservoir 10. An elongated tubular housing member 24 extends through an open 26 provided in the mounting member 22 and through the opening 20 provided in the top plate 18 into the reservoir 10. The tubular housing member 24 is adjustably secured to the mounting member 22 by means of bolts or screws 28.

The filter device 12 preferably further comprises a housing member 30 closing the upper end of the tubular housing member 24 and secured thereto by bolts or screws 32. The tubular housing member 24 forms a filter chamber 34 and the housing member 30 forms an outlet chamber 36 in communication with the filter chamber 34. The housing member 30 is provided with an outlet 38 opening radially to the outlet chamber 36 through a substantially annular chamber 40 and a port 42. A cap member 44 is preferably secured to the housing member 30 by any convenient means such as bolts or screws 45 as shown in FIG. 2 and closes the outlet chamber 36. The cap member 44 is provided with a boss portion 46 extending into the housing member 30 and having an axial recess 48 having a radially enlarged portion 50. A cylindrical cup member 52 is carried in the enlarged portion 50 of the recess portion 48 by means of a set screw 54. An elongated rod 56 is axially slidably mounted in the recess 48 by means of the cup member 52 and extends axially downwardly through the tubular housing member 24. Separation of the cup member 52 and the rod 56 is prevented by a snap ring 60.

A porting member 62 fixed to the rod 56 by any means such as a pin 64 to move axially therewith in the outlet chamber 36. The porting member 62 comprises an upper substantially radially extending portion 66 and a lower annular radially extending portion 68 joined by a plurality of axially extending legs 70. The lower portion 68 is provided with a peripheral flange 72 which carries a piston ring 74 engaging the inner wall of the housing member 30. The lower portion 68 is also provided with a central opening 76 communicating with the interior of the chamber 34. The legs 70 define annularly spaced ports 78 providing communication between the central opening 76 and the outlet 38 through the port 42 and chamber 40.

The boss portion 46 of the cap member 44 is further provided with a recess portion 80 which forms a seat for one end of a spring 82. The other end of the spring 82 is seated against the lower portion 68 of porting member 62 and urges the porting member 62 axially away from the cap member 44 and against an internal shoulder 84 provided in the housing 30.

The rod 56 is enlarged somewhat axially downwardly of the pin 64 and extends through the porting member 62 and into the filter chamber 34. A substantially cylindrical filter element 86 is carried by the rod 56 within the filter chamber 34 and is locked against the lower portion 68 of the porting member 62 by means of a nut 88 and a closure plate 90 carried by the rod 56.

A substantially cylindrical screen member 92 is fixed at its lower end to a circular plate 94 having a peripheral upturned flange portion 95 and being centrally perforated to be received by the end of the rod 56. The screen member 92 extends axially upwardly into the filter chamber 34 from the plate 94 in a position radially spaced from the exterior surface of the filter element 86. The screen member 92 is preferably locked to the rod 56 by the nut 88. The screen member 92 preferably extends approximately one-third to one-half the length of the filter element 86 and is preferably approximately three times or more coarser than the element 86. For example, in a device in which the filter element 86 is 25 microns, the screen member 92 would be from 75 to 150 microns.

The upper portion 66 of the porting member 62 is slotted to receive guide pin 100 and an actuator element 102. The actuator element 102 is twisted about its longitudinal axis and is secured to a shaft 104 which is in turn secured to a pointer element 106 carried exteriorly of the cap member 44 so that axial movement of the actuator element 102 produces a corresponding rotational movement of the shaft 104 and the pointer element 106. The pointer element 106 rotates with the shaft 104 and points to suitable indicia 108 as can best be seen in FIG. 2, provided on the exterior surface of the cap member 44. It is apparent then that upon axial movement of the porting member 62, the actuator element 102 engages in the slot provided in the upper annular portion 66 to produce a corresponding rotation of the shaft 104 and the pointer element 106 so that if a suitable indicia is provided on the exterior surface of the cap member 44, the axial position of the porting member 62 will be indicated by the pointer element 106.

The housing member 30 is provided with a substantially radially extending passage 110 registering with the filter chamber 34. A passage 112 intersects the passage 110 and is provided with a filter member 114. The passage 112 is preferably connected to a suitable air evacuation means 118. A passage 120 also connects with the upper portion of the filter chamber 34 on the side of the housing member 30 opposite the passage 110. The passage 120 is connected by suitable conduit 122 through an auxiliary pump 124 to the reservoir 10 as illustrated diagrammatically in FIG. 1.

In operation, fluid is normally pumped by the pump 14 from the reservoir, axially upwardly to the filter chamber 34, radially inwardly through the screen member 92 and the filter element 86, axially upwardly through the opening 76 and through the ports 78 provided in the porting member 62, into the outlet chamber 36 and through the outlet 38 to the user 16. As the filter member 86 becomes clogged, and a pressure differential across the element will be produced since the upper surface of the flange 72 of porting member 62 is exposed to pressure on the outlet side of the filter 86 and the lower surface of the flange 72 is exposed to pressure on the inside of the filter element 86. When the increased pressure differential reaches a value sufficient to overcome the force exerted by the spring 82, the porting member 62 will move axially toward the cap member 44. Axial movement will then be substantially a linear function of filter condition. As has heretofore been pointed out, each change in the axial position of the porting member 62 will produce a corresponding change in the position of the pointer element 106. Thus with proper indicia 108 on the exterior surface of the cap member 44, the clogged condition of the filter element 86 will be visibly indicated exteriorly of the filter device 12.

As the filter element 86 continues to become clogged and prior to the danger of the increased differential across the element 86 causing the same to rupture, the porting member 62 will have moved axially sufficiently to open a path directly from the inlet side of the filter element 86 past flange 72 of the porting member 62 and into the outlet chamber 36 to the outlet 38.

During operation of the filter system, the screen member 92 tends to collect large foreign particles which would otherwise clog the element. In this way the time between cleaning or replacing the filter element 86 is substantially increased. Further, during operation of the filter system air within the fluid being filtered will collect along the exterior surface of the screen member 92 and when the flow rate changes in the pump 14 or when the bubbles grow in size, it will begin to rise on the outside of the screen member 92 and the filter element 86 and will be pumped back into the reservoir by the continuously operated auxiliary pump 124. In this way the tendency of the air to collect on the filter element 86 and to thereby reduce the area of the filter element performing the filtration is substantially reduced.

When it is desired to remove the filter element 86 for cleaning or replacement, the cap member 44 is removed. The removal of the cap member 44 will cause the porting member 62, the filter element 86 and the screen member 92 to be removed from the device since each of these elements is secured one to the other. As the cap member 44, the porting member 62, and the filter element 86 are being removed for purposes of cleaning or replacement of the filter element 86, a certain amount of backflow or radially outward flow of fluid through the filter element 86 is produced. In the filter devices heretofore disclosed, such a backflow has a tendency to dislodge foreign particles from the exterior surface of the filter element 86 and to deposit the foreign particles back into the reservoir. The screen member 92 reduces the amount of foreign particles dislodged from the exterior surface of the filter element 86 by catching a portion of the foreign particles in the space defined intermediate the screen member 92 and the filter element 86 so that in this way it acts as a basket for removing foreign particles so dislodged and by substantially reducing the rate of backflow through the filter element so that the force tending to dislodge the foreign particles is reduced.

After the filter element 86 has been cleaned or replaced and the filter element 86, the screen 92, and the porting member 62 are installed back into the filter device 12, the air evacuation means 118 is actuated to remove air trapped in the upper portion of the filter chamber 34 by means of passages 110 and 112.

It is apparent that a substantial improvement has been provided for filter devices like those of the aforementioned patent applications, by providing the screen member 92. As heretofore set forth, the screen member 92 provides a means of producing a more efficient operation of the fluid system by providing a means for collecting and removing air from the system, by filtering out larger particles which would otherwise tend to clog the filter element and by providing a means for reducing the amount of and collecting the foreign particles dislodged from a filter element during removal of the filter element.

It is also apparent that although I have described but a single embodiment of my invention, many changes and modifications can be made therein without departing from the spirit of the invention as expressed by the appended claims.

I claim:
1. In combination with a fluid reservoir having an upper wall, a filter device comprising,
   (a) a tubular member having an open inlet end and an open end opposite said inlet end,
   (b) means positioning said tubular member to depend from said upper wall of said reservoir vertically into said reservoir with the inlet end below the level of fluid in said reservoir and said opposite end disposed exteriorly of said upper wall,
   (c) a housing structure including a portion mounted to said opposite end of said tubular member and provided with an outlet,
   (d) a filter assembly and means slidably mounting said filter assembly in said tubular member intermediate said inlet end and said outlet end; and said filter assembly including an annular filter element having an outer surface in communication with said inlet end and an inner surface in communication with said outlet, and
   (e) an inner perforate housing member secured to said filter assembly and including a first portion spaced outwardly from said outer surface of said filter element and surrounding a portion of same adjacent the inlet end of said tubular member to define a collection chamber therebetween and a second portion closing the end of said collection chamber adjacent said inlet end of said tubular member.

2. The combination as defined in claim 1 and in which said filter device includes
   (a) pressure responsive means moving said filter assembly axially within said tubular member in response to changes in the pressure differential across said filter element,
   (b) indicator means actuated by said filter assembly to indicate the axial position thereof and thereby indicate the condition of said filter element.

3. The combination as defined in claim 1 and in which said filter device includes
   (a) pressure responsive means moving said filter assembly axially within said tubular member in response to changes in the pressure differential across said filter element,
   (b) valve means actuated by said filter assembly to open a fluid path directly from said inlet and to said outlet upon said filter assembly being moved to a predetermined axial position by said pressure responsive means.

4. The combination as defined in claim 1 and in which said inner housing further comprises,
   (a) said first portion being cylindrical, and
   (b) said second portion being circular and integral with the lower end of said first portion and being secured to the lower end of said filter element.

References Cited by the Examiner

UNITED STATES PATENTS

| | | | |
|---|---|---|---|
| 2,057,219 | 10/1936 | Vokes | 210—315 |
| 2,057,779 | 10/1936 | Jacobs | 210—172 |
| 2,387,368 | 10/1945 | Vokes | 210—131 |
| 2,575,900 | 11/1951 | Vokes | 210—131 |
| 2,983,384 | 5/1961 | Winslow | 210—130 X |
| 2,994,403 | 8/1961 | Winslow | 210—304 X |
| 3,080,058 | 3/1963 | Rosaen | 210—90 |

FOREIGN PATENTS 240,347   8/1962   Australia.

REUBEN FRIEDMAN, *Primary Examiner.*

SAMIH N. ZAHARNA, *Assistant Examiner.*